Patented May 2, 1950

2,506,361

UNITED STATES PATENT OFFICE 2,506,361

PRODUCTION OF THE HIGHER FATTY ACID ESTERS OF POLY-CHLORINATED PHENOLS

Eric Berkeley Higgins, Welwyn Garden City, England

No Drawing. Application August 27, 1948, Serial No. 46,546. In Great Britain September 2, 1947

6 Claims. (Cl. 260—408)

This invention relates to the production of the higher fatty acid esters of poly-chlorinated phenols.

It has been proposed that the chlorination of phenol, in particular to the higher derivatives—tetra- and pentachlorphenol—should be carried out in an indifferent solvent, for example carbon tetrachloride, in the presence of a chlorine catalyst.

It has now been found that by a modification of this method it is possible to prepare the higher fatty acid esters of the poly-chlorinated phenols in a single operation. This is effected according to the present invention, by treating a solution of phenol or cresol in the theoretical quantity of the higher fatty acid with chlorine either with or without the addition of a chlorine catalyst, and with the addition of phosphorus oxychloride. In the circumstances, the higher fatty acid ester is delivered direct as the end product in a very convenient manner, thus avoiding the necessity of the isolation of the chlorphenol and the separate preparation of a derivative of the fatty acid such as the acid chloride and its subsequent combination by a third stage with the isolated chlorphenol.

The invention is illustrated by the following examples:

*Example 1.—Preparation of lauryl trichlorphenol*

94 lbs. of phenol ($C_6H_5OH$) are mixed with and dissolved in 213 lbs. of commercial lauric acid, and the mixture submitted to the action of chlorine whilst the temperature is maintained at approximately 60° C. and is not allowed to exceed 70° C. or fall below 50° C. until 103.5 lbs. increase in weight has taken place in the charge; that is to say until 3 chlorine atoms have been introduced into the benzene nucleus. The duration of this operation is regulated by the speed at which chlorine is admitted which, as the reaction is strongly exothermic, is itself controlled by the perfection of the cooling provided, so that the stipulated temperature range may be maintained. The passage of chlorine is now discontinued and 106 lbs. of phosphorus oxychloride are added to the mass. Stirring is in any case unnecessary. The temperature is then raised to 80° C. when a rapid evolution of hydrochloric acid indicates the start of the second reaction. As the reaction abates, the temperature is raised slowly to 105° C. This whole operation occupies about one hour. The reaction mass is allowed to stand, preferably for 12 hours, during which period free phosphoric acid collects at the bottom of the container, and can be easily run off from the oil charge above it. This oil is then blown directly by air pressure into dilute caustic soda, say about 0.5 normal strength, fresh alkali being added if necessary to maintain the reaction of the mass alkaline. After well stirring together, the ester is allowed to settle and is then drawn off, washed well with water and is ready for use. Should the charge be discoloured it is readily bleached in the known manner by treatment with fuller's earth. The yield is practically quantitative.

*Example 2.—Preparation of stearyl tetra- or pentachlorphenol*

94 lbs. of phenol are mixed with and dissolved in 284 lbs. of commercial stearic acid, the temperature raised to and maintained at 70° C. and gaseous chlorine led into the mass. Hydrochloric acid is evolved. When enough chlorine has been absorbed to produce substitution to the point of the trichlorphenol or a little above this, 5% by weight of anhydrous ferric chloride calculated on the weight of the phenol is added to the mass. The appropriate time for this addition is indicated by the appearance of free chlorine in the emergent gases. Chlorine is allowed to act still further on the mass until its weight is increased to the extent corresponding either to the tetra- or pentachlor product. The stream of chlorine is now discontinued and 106 lbs. of phosphorus oxychloride added to the mass, the temperature of which is then raised, if necessary, to 80° C. maintained there for about an hour, and then raised slowly to 105° C. The whole operation occupies about 1½ hours. The mass is allowed to settle and its residual phosphoric acid containing a great deal of the iron catalyst is run to waste and the ester blown into dilute caustic soda as in Example 1. Any remaining iron in the ester is readily removed by treatment with sodium bisulphite solution preferably of the same specific gravity as the ester itself to enable good mixing and extraction to be carried out with ease.

As a variation of the above Example 2, instead of the anhydrous ferric chloride, an equal weight of zinc chloride may be used at catalyst thereby avoiding the risk of discolouration which arises from the use of an iron salt.

It is clear that in order to avoid the technical inconvenience arising from an effluent gas containing a mixture of hydrochloric acid and chlorine, the operation can be carried out, and preferably is carried out, on a counter-current principle.

I claim:

1. A method for the production of a higher fatty acid ester of a polychlorinated phenol which comprises reacting chlorine with phenol in solution in the theoretical quantity of the corresponding higher fatty acid and adding phosphorus oxychloride to the reaction mass.

2. A method for the production of a higher fatty acid ester of a polychlorinated phenol which comprises reacting chlorine with phenol in solution in the theoretical quantity of the corresponding higher fatty acid in the presence of a chlorination catalyst and adding phosphorus oxychloride to the reaction mass.

3. A method for the production of a higher fatty acid ester of a polychlorinated phenol which comprises reacting chlorine with phenol in solution in the theoretical quantity of the corresponding higher fatty acid while maintaining the temperature of the solution from 50° C. to 70° C. and adding phosphorus oxychloride to the reaction mass, raising the temperature of the mass to 80° C. and as the reaction abates slowly raising the temperature to 105° C.

4. A method for the production of a higher fatty acid ester of a polychlorinated phenol which comprises reacting chlorine with phenol in solution in the theoretical quantity of the corresponding higher fatty acid until the phenol has taken up at least three chlorine atoms in the benzene nucleus while maintaining the temperature of the solution from 50° C. to 70° C., then adding phosphorus oxychloride to the reaction mass, and raising the temperature to a temperature at which rapid evolution of hydrochloric acid is instigated.

5. A method for the production of lauryl trichlorphenol which comprise dissolving phenol in the theoretical quantity of lauric acid, subjecting the resulting solution to the action of chlorine until the benzene nucleus has taken up three chlorine atoms and adding phosphorus oxychloride to the reaction mass.

6. A method for the production of a stearic acid ester of a phenol chlorinated to a degree above trichlorphenol which comprises dissolving phenol in the theoretical quantity of stearic acid, subjecting the resulting solution to the action until substitution has been produced at least to the point of trichlorphenol, adding a chlorination catalyst to the reaction mass, continuing the action of chlorine on the reaction mass until the desired degree of chlorination is attained, and adding phosphorus oxychloride to the reaction mass.

ERIC BERKELEY HIGGINS.

REFERENCES CITED

The following references are of record in the file of this patent:

UNITED STATES PATENTS

| Number | Name | Date |
| --- | --- | --- |
| 970,662 | Sulzberger | Sept. 20, 1910 |
| 1,452,553 | Gardner | Apr. 24, 1923 |
| 2,082,790 | Cherry | June 8, 1937 |
| 2,239,533 | Mikeska | Apr. 22, 1941 |
| 2,345,006 | Ross | Mar. 28, 1944 |

OTHER REFERENCES

"An Outline of Organic Chemistry," by Degering, Nelson and Harrod, 1937 ed., p. 191, Barnes & Noble, Inc., N. Y., publishers.